UNITED STATES PATENT OFFICE.

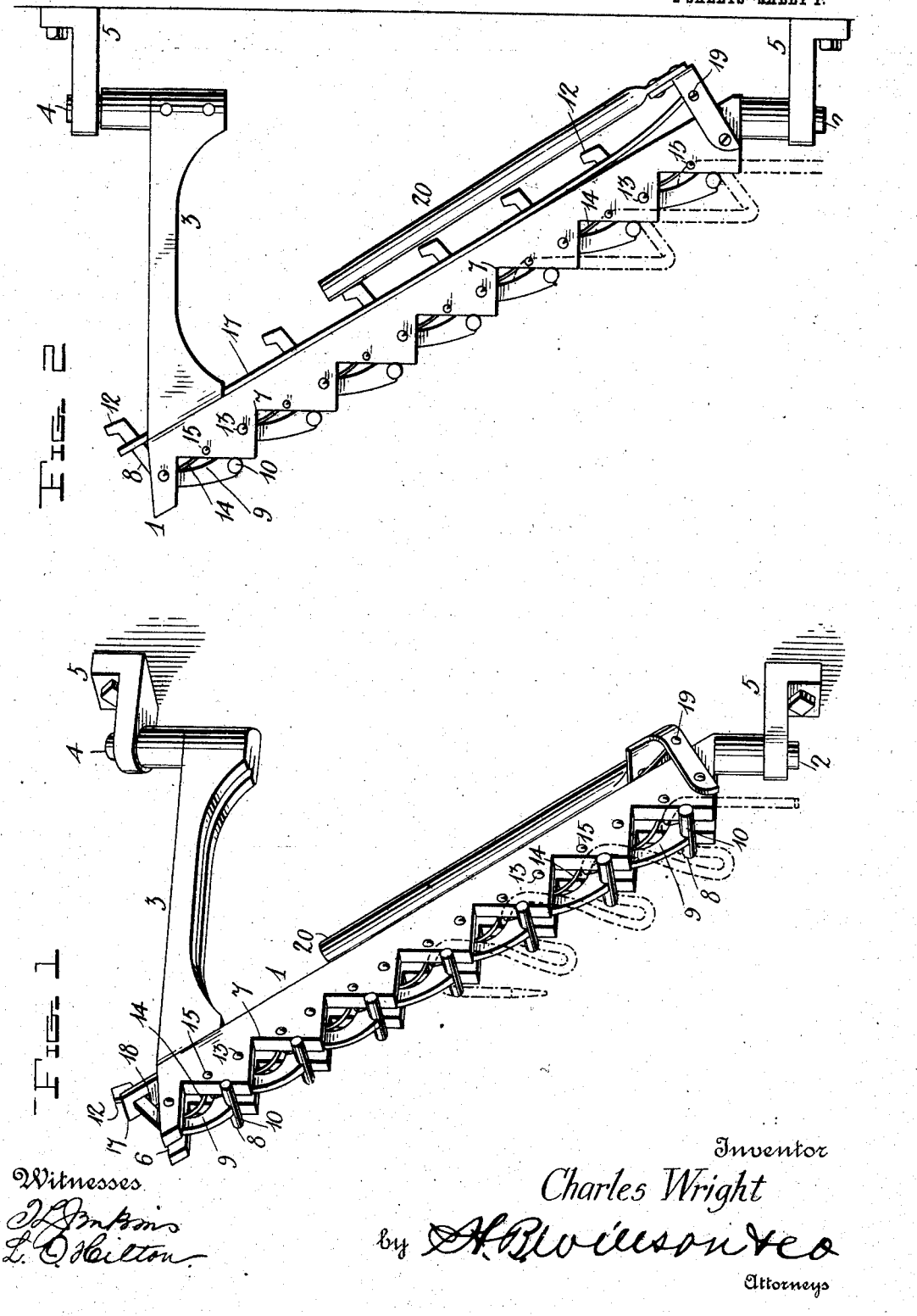

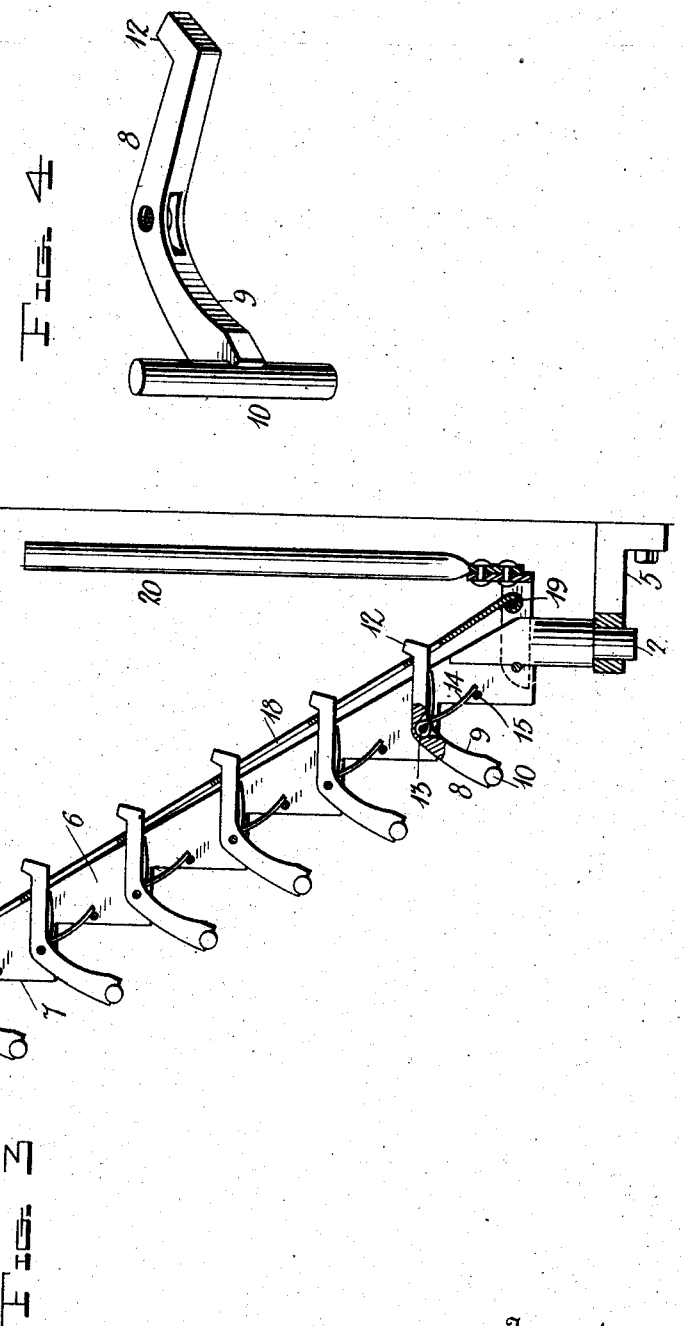

CHARLES WRIGHT, OF SOUTH GREENSBURG, PENNSYLVANIA, ASSIGNOR TO J. A. BINKEY, OF GREENSBURG, PENNSYLVANIA.

HOSE-RACK.

No. 846,713.  Specification of Letters Patent.  Patented March 12, 1907.

Application filed August 6, 1906. Serial No. 329,496.

*To all whom it may concern:*

Be it known that I, CHARLES WRIGHT, a citizen of the United States, residing at South Greensburg, in the county of Westmoreland and State of Pennsylvania, have invented certain new and useful Improvements in Hose-Racks; and I do declare the following to be a full, clear, and exact description of the invention, such as will enable others skilled in the art to which it appertains to make and use the same.

This invention relates to improvements in hose-racks.

The object of the invention is to provide a rack by means of which a hose may be supported in a convenient but out of the way position when not in use and from which the hose may be partially removed, means being provided whereby the entire hose may be quickly released and discharged from the rack.

With this and other objects in view the invention consists of certain novel features of construction, combination, and arrangement of parts, as will be more fully described, and particularly pointed out in the appended claims.

In the accompanying drawing, Figure 1 is a perspective view of a hose-rack constructed in accordance with the invention, showing the hose arranged thereon. Fig. 2 is a side view of the same. Fig. 3 is a vertical sectional view showing the parts in position to release the hose, and Fig. 4 is a detail perspective view of one of the hose-holding clamps.

Referring more particularly to the drawings, 1 denotes the supporting-bar of the rack, said bar being preferably arranged at an angle or inclination, as shown. On the lower end of the bar 1 is formed a journal or bearing-stud 2, and to the upper end of the bar is connected a laterally-projecting horizontally-disposed arm or bar 3, on the inner end of which is formed an upwardly-projecting bearing stud or journal 4. The journals 2 and 4 are adapted to be engaged in suitable bearing-brackets 5, secured to a stand-pipe, wall, or other suitable support, whereby the rack may be swung into and out of an operative position. The bar 1 is preferably formed with a longitudinally-disposed slot or passage 6 and on the forward edge is provided with a series of steps or notches 7, which form seats to receive the coils of the hose.

Pivotally mounted in the slot 6, adjacent to each of the notches or steps 7, is a clamp 8, by means of which the coil of hose is held in place in the seats formed by the notches 7. The clamps 8 are preferably in the form of curved or angular bars 9, the inner edge of the outer end of each of which has a recess rounded out to form an engaging surface for the hose-coil. The outer ends of the bars 9 are provided with laterally-projecting lugs 10, which form a cross-head on said end of the clamping-bars. The opposite end of the bars are provided with upwardly-projecting right-angularly formed lugs 12. The clamps 8 are pivotally mounted in the slot 6 upon bearing pins or shafts 13, around each of which is coiled a spring 14, one end of which bears against the under side of the rear end of the bars 9, while the opposite end engages a stop-pin 15, which passes through the bar 1 across the slot 6, thereby yieldingly holding the clamps in engagement with the seats formed by the notches 7, or into engagement with the coils of the hose when placed therein, thereby supporting the coils in position.

Slidably mounted in the rear side of the bar 1 and adapted to move up and down through a guide-passage 16 of the arm 7 is a releasing-bar 17, said bar being provided with a series of elongated apertures or slots 18, through each of which is adapted to project the rear end of one of the clamping-bars 9. The lower end of the releasing-bar 17 is pivotally connected to a cross-pin 19 in the bifurcated right-angularly formed lower end of the operating-lever 20, which is pivotally connected with the lower end of the supporting-bar 1, as shown, whereby when said lever is swung rearwardly the bar 17 will be drawn downwardly, thereby engaging the upper walls of the slots 18 with the upper edges of the rear ends and the lugs 12 on the clamping-bars 9, thus simultaneously rocking all of said bars to the position shown in Fig. 3 of the drawings, which will permit all of the coils of the hose to drop from the rack.

In arranging the hose upon the rack the inner end of the same may be connected to a stand-pipe or other water-supply, after which the hose may be engaged in the form of coils with each successive seat or notch 7 and supported by the spring-actuated clamps 8, the nozzle end of the hose being held by the uppermost clamp, so that if it be desired to remove but a portion of the hose said nozzle end may be grasped and as many coils as desired pulled out of engagement with the notches 7, the yielding engagement of the clamps 8 therewith permitting said coils to be pulled from beneath the same.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having described my invention, what I claim as new, and desire to secure by Letters Patent, is—

1. In a hose-rack the combination with a pivotally-mounted inclined supporting-bar, of a series of notches arranged in the outer edge thereof, to form coil-seats, spring-actuated clamping devices to hold said hose-coils in place in said seats, a releasing-bar to engage said hose-clamps and means to actuate said bar to simultaneously disengage said clamping devices from the hose-coils, substantially as described.

2. In a hose-rack the combination with a pivotally-mounted inclined supporting-bar, of a series of notches arranged therein to form hose-coil seats, a series of angular clamping-bars pivotally mounted on said bar, curved hose-engaging surface formed on the inner edges of the outer ends of said clamping-bars to engage the coils of hose in said seats or notches, springs connected to said clamping-bars to hold the same in yielding engagement with said hose-coils, a slotted releasing-bar to engage the rear ends of said clamping-bars, and means to actuate said releasing-bar to disengage said clamping-bars from the hose-coil, substantially as described.

3. In a hose-rack the combination with a pivotally-mounted inclined supporting-bar having formed therein a longitudinally-disposed slot or passage, of a series of notches forming seats in the forward or outer side of said bar, angular hose-clamping bars pivotally mounted in said slot adjacent to said seats or notches, a cross-head formed on the outer end of said clamping-bars, an upwardly-projecting lug formed on the inner ends thereof, springs connected to said clamping-bars to hold the same in yielding engagement with the hose-coils, a releasing-bar slidably mounted on the rear side of said supporting-bar in engagement with the rear ends of said clamping-bars and an operating-lever pivotally mounted on the lower end of said supporting-bar and connected to said releasing-bar whereby the latter may be actuated to simultaneously operate the clamping-bars to disengage the same from the hose-coils, substantially as described.

In testimony whereof I have hereunto set my hand in presence of two subscribing witnesses.

CHARLES WRIGHT.

Witnesses:
 N. A. LOOR,
 J. A. BINKEY.